United States Patent

Thompson et al.

[11] 3,933,663
[45] Jan. 20, 1976

[54] TERTIARY DIAMIDE AS SWELLING AGENT FOR ELASTOMERIC SEAL

[75] Inventors: Robert M. Thompson, Wilmington, Del.; Francois E. Didot, Chadds Ford, Pa.

[73] Assignee: Sun Ventures, Inc., St. Davids, Pa.

[22] Filed: Dec. 10, 1973

[21] Appl. No.: 423,390

Related U.S. Application Data

[63] Continuation-in-part of Ser. No. 293,984, Oct. 2, 1972, abandoned.

[52] U.S. Cl.............. 252/51.5 A; 252/72; 252/77; 260/561 K
[51] Int. Cl.$^2$.............. C10M 1/36; C10M 3/30
[58] Field of Search................ 252/72, 77, 51.5 A; 260/561 K

[56] References Cited
UNITED STATES PATENTS

| | | | |
|---|---|---|---|
| 2,594,286 | 4/1952 | Bryant et al. | 252/51.5 A |
| 3,296,303 | 1/1967 | Nemec et al. | 260/561 K |
| 3,312,620 | 4/1967 | Low et al. | 252/51.5 A |

*Primary Examiner*—George F. Lesmes
*Assistant Examiner*—Charles E. Lipsey
*Attorney, Agent, or Firm*—J. Edward Hess; Donald R. Johnson; Anthony Potts, Jr.

[57] ABSTRACT

An improved method of transmitting power in a hydraulically operated mechanism which comprises adding to the operative liquid a certain amount of a tertiary diamide having the following structural formula:

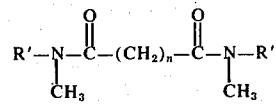

wherein n = 4–12

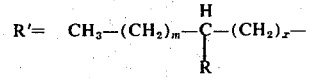

and wherein
R R H, alkyl radical having $C_1$–$C_5$
m = 2–8
x G2x 1–5

The tertiary diamide imparts to the liquid the property of swelling seals in the mechanical system and thereby prevents leakage.

8 Claims, No Drawings

TERTIARY DIAMIDE AS SWELLING AGENT FOR ELASTOMERIC SEAL

CROSS-REFERENCES TO RELATED APPLICATIONS

This application is a continuation-in-part of Ser. No. 293,984, filed Oct. 2, 1972, now abandoned. The latter is related to the following applications:

| Serial Numbers | Inventors |
| --- | --- |
| 293,979 | R. M. Thompson |
| 293,980 | R. M. Thompson |
| 293,981 | R. M. Thompson |
| 293,982 | R. M. Thompson |
| 293,983 | R. M. Thompson and A. F. Talbot |

The last five aforementioned applications were filed the same date as application Ser. No. 293,984. The first and second of the aforementioned applications relate to novel classes of diamides; the third and fourth relate to the use of certain diamides as lubricants and the last to the use of certain diamides in grease. The aforementioned application Ser. No. 293,981 is now abandoned; the aforementioned application Ser. Nos. 293,979; 293,982; and 293,983 are now U.S. Pat Nos. 3,888,894; 3,827,981; and 3,827,980, respectively.

BACKGROUND OF THE INVENTION

Along with the development of various mechanism for transmitting power has arisen the need for suitable liquids which perform essential functions in the operation of those mechanisms. Operation of these complex mechanisms often requires that the liquid function in several different capacities. The liquid not only serves as a lubricant and coolant in reducing the friction and heat developed during operation of the mechanism, but also performs other key functions. In the case of automatic transmissions for automotive vehicles, for example, the liquid functions hydrokinetically in the liquid coupling or torque converter, depending upon the type of transmission, and in the hydraulic operation of the various mechanical components of the driving unit.

In most hydraulic systems the hydraulic liquid must lubricate the frictional parts of the system in addition to performing the primary function of transmitting power. The parts which are so lubricated include the frictional surfaces of the liquid pump, operating pistons, cylinders, valves and liquid motors. Many of these components are complex mechanical devices.

Automatic transmissions, industrial hydraulic systems, gear reducers, collision bumpers and the like, employ functional liquids having base stocks selected from naturally occurring oils of mineral origin or synthetic liquids such as that described in U.S. Pat. No. 3,577,361, W. C. Hammann et al, May 4, 1971. However, such liquids by themselves do not possess the characteristics which enable them to perform satisfactorily in such demanding applications. Thus, it is a general practice to add small amounts of other materials to these base stocks to affect one or more of the properties thereof. Among these latter materials are viscosity index improvers, detergent-inhibitors and swelling agents. These additives are described in U.S. Pat. No. 3,389,088, W. C. Schar et al, June 18, 1968.

While the aforementioned power transmission liquids perform satisfactorily, there has been a need to improve their properties with respect to freedom from leakage. This leakage, for example, from vehicle automatic transmission systems, pollutes our environment. The principal reason for the leakage is the deterioration of the elastomeric seals or gaskets or other similar devices. The deterioration can be defined as a change in the dimensions of a seal caused by mechanical wear and/or the liquid through a chemical-physical means.

As a result of this there have been numerous attempts to develop a material that can be added to the liquid that is present in power transmissions to revitalize the leaking seals or gaskets by swelling and softening the elastomer in those seals. An additive for this purpose must not be too potent in its elastomeric swelling properties because excessive swelling and softening of the transmission seals will cause seal failure. Also, the additive must not lower the viscosity of the automatic transmission liquid nor impair its oxidation stability.

As an alternative, the material could be present in the power transmission fluid when it was initially placed in the transmission equipment.

SUMMARY OF THE INVENTION

This invention pertains to an improved method of transmitting power in a hydraulically-operated mechanism. More specifically, it relates to the use of an improved hydraulic liquid containing certain percentages of a tertiary diamide having the following formula:

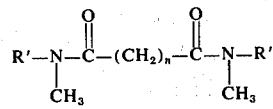

wherein

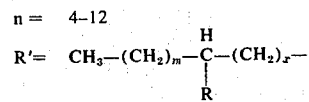

$n = 4\text{-}12$ and wherein
$R = H$, alkyl radical having $C_1\text{-}C_5$
$m = 2\text{-}8$
$x = 1\text{-}5$ in an apparatus in which mechanical forces are transmitted or absorbed, e.g., in automotive transmission, hydraulic system, shock absorbed, hydraulic steering mechanism, clutch, collision bumber and other mechanical devices. The invention also pertains to the hydraulic liquid containing the tertiary diamide. The tertiary diamide serves as a swelling agent.

DESCRIPTION OF THE INVENTION

It has now been discovered that tertiary diamides having the structural formula shown in the Summary of the Invention imparts to a power transmitting liquid the property of swelling an elastomeric seal in the mechanical system and thereby prevents leakage which pollutes our environment.

The swelling agents of this invention can be prepared by reacting a normal paraffinic diacid with a secondary amine wherein one radical is a methyl. This general reaction is illustrated by the following equation:

(1) 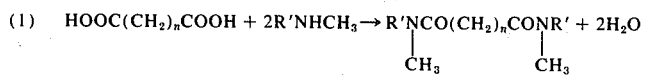

The normal paraffinic diacid of equation (1) can contain 6–14 carbon atoms; preferably 8–12. Accordingly n of the diacid of equation (1) equals 4–12, preferably 6–10. Examples of such acids are suberic, azelaic and sebacic. The secondary amine of equation (1) contains a methyl and R'. The latter

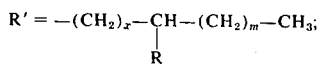

wherein $x = 1-5$, $R = H$ or an alkyl radical containing $C_1$–$C_5$ and $m = 2-8$. A preferred R' is one wherein $x = 1$; more preferably $x = 1$ and $R = H$ and $m = 3-6$. Preparation of primary and secondary amines and the physical and chemical properties of the amines are given in Kirk-Othmer, *ENCYCLOPEDIA OF CHEMICAL TECHNOLOGY*, 2nd Edition, Volume 2, Amines (Survey).

Another method involves reacting a normal paraffinic diacylhalogen, e.g., a dizcylchloride, with a secondary amine wherein one radical is a methyl. This general reaction is illustrated by the following equation:

(2) 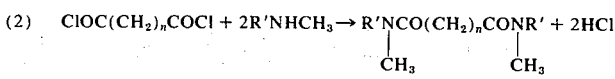

In equation (2) $n$, as in equation (1), equals 4–12, preferably 6–10. R' is the same as in general equation (1).

Seal refers to the material for packing pistons, making pipe joints, and similar devices. Seal also includes mechanical seals which form a running seal between flat, precision-finished surfaces. These latter seals are described in *PERRY'S CHEMICAL ENGINEER'S HANDBOOK*, Perry, Chilton, Kirkpatrick, 4th Edition, Section 6, Transport & Storage of Fluids. Seal, as defined herein, also includes gaskets, O-rings and other similar devices which are also described in the aforementioned handbook.

Elastomeric refers to the material of construction of the aforementioned seal. The material can be a synthetic or natural one. Some examples of synthetic elastomers are styrenebutadiene copolymer, acrylonnitrilebutadiene copolymer, polyisoprene, polybutadiene, butyl rubber, urethane, chlorosulfonated polyethylene and others, all of which are described in *ENCYCLOPEDIA OF CHEMICAL TECHNOLOGY*, Kirk-Othmer, 2nd Edition, Vol. 7, Elastomers, Synthetic. Natural material of construction relates to the various natural rubbers defined in Vol. 17, of the aforementioned encyclopedia.

The power transmitting liquid normally comprises a major amount of base stock and a minor amount of additives. The base stock can be a natural or synthetic liquid. Examples of natural liquids include, e.g., mineral oils such as lubricating oils. Examples are extracted bright stock, solvent refined stock and other similar refined petroleum lubricating fractions. Processes for preparing these materials are disclosed in *ENCYCLOPEDIA OF CHEMICAL TECHNOLOGY*, Kirk-Othmer, 2nd Edition, Volume 15, Petroleum, pps. 1–76. Resulting products are disclosed in the same reference, pps. 77–92. Properties of mineral lubricating oils are disclosed in the aforementioned encyclopedia, Volume 12, Lubrication and Lubricants, pps. 557–576.

Synthetic liquids are also suitable. Examples include polymerized olefins, esters, polyglycols, silicones, phosphates, chlorinated aromatics and fluorochemicals. Properties of the particular members of these classes are disclosed in the aforementioned encyclopedia, Volume 12, Lubrication and Lubricants, pps. 576–582.

Additives incorporated with the base stock fulfill numerous functions. A few such functions include inhibiting oxidation which in turn delays formation of varnish, sludge and acids. Another function is rust reduction. These are surface-active materials which are preferentially adsorbed as a film on iron and steel surfaces to protect them from attacks by moisture. Other additives include dyes, odorizers, detergents, viscosity index improvers, pour point depressants and the like. More than one such additive may be present, however, none may be used. Such additives are disclosed in the aforementioned encyclopedia, Volume 12, Lubrication and Lubricants, pps. 574–576.

Thus the swelling agent of present invention has utility in the aforementioned fluids, i.e., base stock with or without additives wherein the base stock is a natural or synthetic fluid as heretofore defined.

Generally a power transmitting liquid, such as a transmission and/or hydraulic liquid is contained within the mechanical system by seals. These seals are elastomeric in construction and are designed to swell to a certain degree when penetrated by the liquid. Swell refers to an increase in volume of the seal. Thus the tertiary diamides of present invention can also be referred to as a swelling agent.

In practicing this invention, the power transmitting liquid comprises, in addition to the base stock and any of the additives, up to 20 volume percent of the tertiary diamide. The preferred compositions contain 0.5 – 15 volume percent of the tertiary diamide and the particularly preferred composition contains 1.0 – 10 volume percent of the tertiary diamide.

One advantage of the tertiary diamide is that it has a greater efficiency for swelling elastomeric seals then other known seal swelling agents. For example, less then half as much diamide liquid is required for swelling acrylonnitrilebutadiene elastomer to the same degree as dioctylphthalate. The latter ester having utility as a swelling agent. Coupled with the diamide's greater efficiency is that the diamides have high boiling points and have excellent thermal and oxidative stability. The latter permits the liquid to be used within systems at higher operating temperatures.

EXAMPLE

The procedure for determining the effectiveness of the tertiary diamides as swelling agents was as follows:

Samples of elastomers were immersed in vessels containing a power transmitting liquid having no swelling agent. The samples were immersed for 70 hours with the liquid maintained at a temperature of 300°F. As shown in the accompanying table, the acrylonnitrile-butadiene elastomer suffered a decrease in volume whereas the polyacrylate elastomer incurred an increase in volume.

TABLE

| Elastomer Swelling Agent % Volume of Swelling Agent[3] | % Change in Elastomer Volume[4] | | | |
|---|---|---|---|---|
| | Acrylonnitrile-Butadiene | | Polyacrylate | |
| | DOP[1] | Diamide[2] | DOP[1] | Diamide[2] |
| 0 | −1.64 | −1.64 | +1.85 | +1.85 |
| 5 | +0.80 | +3.35 | +3.30 | +5.10 |
| 10 | +2.00 | +7.75 | +6.00 | +7.70 |

[1]DOP = dioctylphthalate, a known seal swelling agent.
[2]Diamide = N,N-dimethyl-N,N-dioctylazelamide.
[3]Swelling agent is incorporated in a solvent refined petroleum stock having a viscosity of 120 SUS at 100°F.
[4]Immersion time, 70 hours at 300°F.

Also, samples of elastomers were immersed in vessels containing a power transmitting liquid having swelling agents. The liquid in one group of vessels contained dioctylphthalate. The amounts of ester in the liquid were as shown in the table. The liquid in another group of vessels contained N,N-dimethylN,N-dioctylazelamide. The amounts of the diamide in the liquid were as shown in the aforementioned table. After 70 hours had elapsed the samples of the elastomer were removed and the change in volumes determined. These changes are reported in the table.

The results shown in the accompanying table demonstrate that at a given concentration of swelling agent in the power transmitting liquid, the increase in elastomeric volume with the diamide was substantially greater than that with the dioctylphthalate. Thus the same amount of increase in elastomeric volume can be obtained by using much smaller amounts of diamide in the base liquid.

Analogous results will be obtained when other diamides, e.g., N,N′-dimethyl-N,N′-dihexylazelamide, N,N′-dimethyl-N,N′-di2-ethylhexylazelamide, N,N′-dimethyl-N,N′-di-2-ethylhexylsebacamide, are used. Use of hydrocarbon liquids other than the aforementioned solvent refined stocks, such as extracted bright stock will yield analogous results. Similar results will be obtained when using the following synthetic liquids: polyisobutene, polybutene, methyl silicone, tricresyl phosphate, diesters derived from adipic, azelaic or sebacic acids esterified with $C_8$ to $C_9$ branched-chain alcohols, polypropylene glycol, polychlorotrifluoroethylene, chlorinated biphenyl, polyphenyl ether, and hex(2-ethylbutoxy) disiloxane.

The invention claimed is:

1. In a method for transmitting power by a lubricating liquid wherein an elastomeric seal is subject to deterioration, the improvement which comprises adding to said liquid about 0.5 to 20 volume percent of at least one tertiary diamide having the following formula:

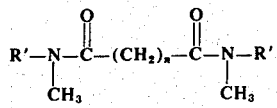

wherein

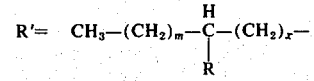

wherein
R = H, alkyl radical having $C_1$-$C_5$
$m$ = 2-8
$x$ = 1-5
whereby said diamide causes said seals to swell thereby reducing leakage.

2. Method according to claim 1 wherein the volume percent of the diamide is 0.5 – 15.

3. Method according to claim 1 wherein the volume percent of the diamide is 1.0 – 10.

4. Method according to claim 2 wherein the method for transmitting power is an automatic transmission.

5. Method according to claim 2 wherein the method for transmitting power is a hydraulic brake.

6. A power transmitting and lubricating liquid comprising about 0.5 –20 volume percent of at least one tertiary diamide having the following formula:

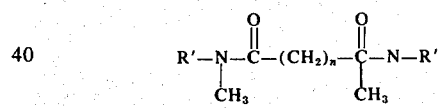

wherein

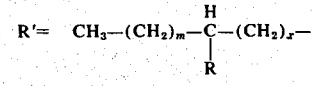

wherein
R = H, alkyl radical having $C_1$-$C_5$
$m$ = 2-8
$x$ = 1-5
said diamide imparting to the liquid the property of swelling seals and thereby preventing leakage.

7. Liquid according to claim 6 wherein the volume percent of the diamide is 0.5 –15.

8. Liquid according to claim 6 wherein the volume percent of the diamide is 1.0 –10.

* * * * *